US012639427B2

(12) United States Patent
Ray et al.

(10) Patent No.: US 12,639,427 B2
(45) Date of Patent: *May 26, 2026

(54) RETROSPECTIVE MEMORY ANALYSIS

(71) Applicant: Microsoft Technology Licensing, LLC, Redmond, WA (US)

(72) Inventors: Marsh Jordan Ray, Redmond, WA (US); Michael T. Walker, Snoqualmie, WA (US); Brian M. Caswell, Linthicum, MD (US)

(73) Assignee: Microsoft Technology Licensing, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/627,148

(22) Filed: Apr. 4, 2024

(65) Prior Publication Data

US 2024/0248987 A1 Jul. 25, 2024

Related U.S. Application Data

(63) Continuation of application No. 17/363,124, filed on Jun. 30, 2021, now Pat. No. 11,977,629.

(51) Int. Cl.
| | |
|---|---|
| *H04L 29/06* | (2006.01) |
| *G06F 21/55* | (2013.01) |
| *G06F 21/56* | (2013.01) |
| *G06F 21/79* | (2013.01) |

(52) U.S. Cl.
CPC .......... *G06F 21/554* (2013.01); *G06F 21/552* (2013.01); *G06F 21/566* (2013.01); *G06F 21/79* (2013.01)

(58) Field of Classification Search
CPC .... G06F 21/554; G06F 21/552; G06F 21/566; G06F 21/79; G06F 21/55; G06F 21/56; H04L 9/40
See application file for complete search history.

(56) References Cited

U.S. PATENT DOCUMENTS

| | | | | |
|---|---|---|---|---|
| 2007/0006048 A1* | 1/2007 | Zimmer | ................ | G06F 11/008 |
| | | | | 714/42 |
| 2016/0299809 A1* | 10/2016 | McCoy | ................. | G06F 11/366 |
| 2020/0322802 A1* | 10/2020 | Raleigh | ............. | H04W 28/0215 |

OTHER PUBLICATIONS

Communication under Rule 71(3) EPC Received in European Patent Application No. 22738093.8, mailed on Mar. 20, 2026, 06 pages.

* cited by examiner

*Primary Examiner* — Evans Desrosiers

(57) ABSTRACT

Aspects of the present disclosure relate to retrospective memory analysis. In examples, a historical archive of memory images for an execution environment is maintained. A historical memory image of the historical archive may be evaluated according to a current set of known issues, rather than issues that were known at the time of the memory capture. Accordingly, it may be possible to determine when the execution environment was last in a good environment condition. As another example, it may be possible to determine whether a now-known issue has since been resolved (e.g., such that the issue would not be identified in the current execution environment). Thus, as compared to contemporaneous issue identification techniques, aspects of the present disclosure may be applied to any number of execution environments to enable retrospective identification of now-known issues that were, at least at the time of a memory capture, not known.

20 Claims, 9 Drawing Sheets

800

RETROSPECTIVE MEMORY ANALYSIS

CROSS-REFERENCE TO RELATED APPLICATIONS

This application is a continuation of U.S. patent application Ser. No. 17/363,124, filed on Jun. 30, 2021, the disclosure of which is hereby incorporated by reference in its entirety.

BACKGROUND

Known issues, such as the presence of known malware, may be identified of an execution environment and mitigated accordingly. However, some issues may evade detection, for example because they are not yet known. Such issues may instead be detected at a later date, once the issue becomes known. In some instances, even after an issue becomes known, it may not be detected, as it may no longer be present within the execution environment. Thus, while contemporaneous issue identification and resolution may be effective for known issues, it is difficult to manage risks associated with issues that are present but are yet to be identified.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to retrospective memory analysis. In examples, a historical archive of memory images for an execution environment is maintained. A historical memory image of the historical archive may be evaluated according to a current set of known issues, rather than issues that were known at the time of the memory capture. Accordingly, it may be possible to determine when the execution environment was last in a good environment condition. As another example, it may be possible to determine whether a now-known issue has since been resolved (e.g., such that the issue would not be identified in the current execution environment). Thus, as compared to contemporaneous issue identification techniques, aspects of the present disclosure may be applied to any number of execution environments to enable retrospective identification of now-known issues that were, at least at the time of a memory capture, not known.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
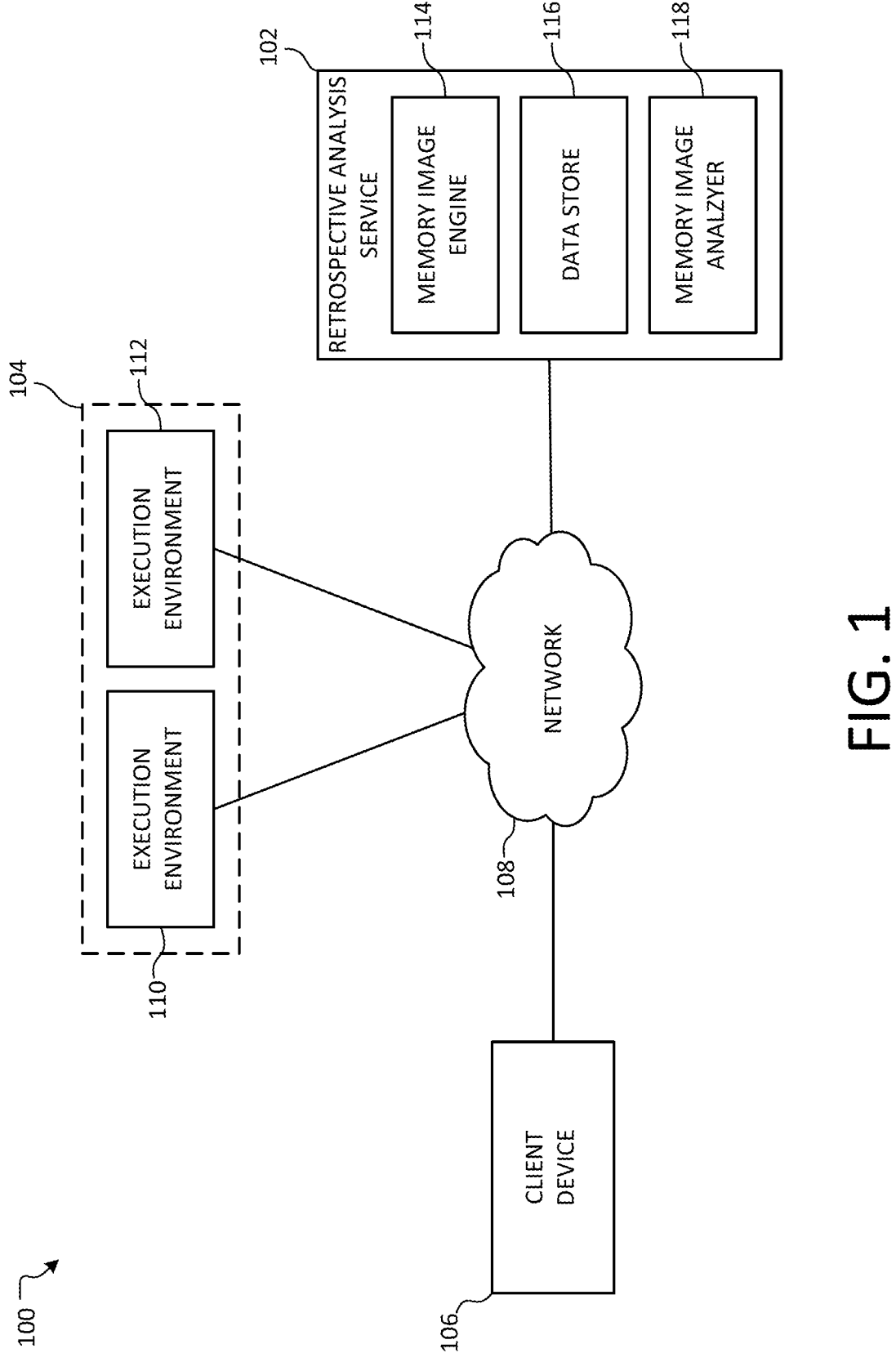
FIG. 1 illustrates an overview of an example system for retrospective memory analysis.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, known issues are identified as a result of monitoring characteristics of an execution environment, including, but not limited to, executing processes, the executable content associated with such executing processes, open files, and/or open network sockets, among other examples. Example issues include viruses, adware, spyware, and ransomware. It will be appreciated that an issue need not be restricted to malware and, in other examples, may be an issue resulting from the use of the execution environment. Other such example issues include data theft or other instances of computer abuse. Thus, an issue may have an associated signature based on characteristics of the execution environment, such that the identification of such characteristics may be determined to indicate the associated issue is likely present in the execution environment.

However, an issue may exist for which an associated signature has not yet been determined. As an example, a new variant of malware may infect an execution environment prior to its detection, such that an associated signature has not yet been determined. In the above-described environment in which signatures are used to perform substantially contemporaneous issue identification (e.g., based on execution environment characteristics), only after a signature is determined for the new variant may the issue be identified. As a result, there may be a lag between issue manifestation and issue detectability. This lag may make it difficult to identify how long an issue has been present, as well as the associated scope and risk. As another example, it may be difficult to certify or attest to the last date at which the execution environment was in a known good state according to a current set of known issues (as compared to the set of issues that was known at some time in the past). Further, an issue may not have associated files (e.g., file-less malware or behavior associated with computer abuse) or may not be detectable according to metadata that is typically stored (e.g., debugging logs or file access logs), such that retrospective identification of such issues may be very difficult or impossible.

Accordingly, aspects of the present application relate to retrospective memory analysis. In examples, volatile memory associated with an execution environment may be captured and stored for subsequent analysis. For example, a data store may store historical memory images for the execution environment, thereby enabling retrospective analysis according to a current set of known issues. As a result, memory images in which an issue is identified may be determined, such that it may be determined when the execution environment first exhibited the issue or, in other examples, whether there was a point in time at which the issue was no longer present. As another example, the historical memory images may be processed to certify that the execution environment was patched for a vulnerability as of a certain date. Thus, it will be appreciated that the retrospective memory analysis techniques described herein may be applied in any of a variety of scenarios.

An execution environment includes, but is not limited to, a guest virtual machine managed by a hypervisor of a host computing device, an execution environment may be that of a container executing on a host computing device, or a bare metal execution environment (e.g., that of a host device or that of a device on which such virtualization techniques are not used), among other examples. Thus, it will be appreciated that the aspects described herein may be used with respect to any of a variety of execution environments.

Any of a variety of memory capture techniques may be used, such as capturing a memory image of a suspended execution environment or those described in U.S. patent application Ser. No. 17/333,449, filed on May 28, 2021, and titled "Volatile Memory Acquisition," the entire disclosure of which is hereby expressly incorporated by reference. In some instances, different capture techniques may be used for different types of execution environments. For example, different techniques may be used for a virtual machine execution environment as compared to a bare metal execution environment. In examples, historical memory images may be stored according to differential encoding techniques and/or compressed, among other examples.

FIG. 1 illustrates an overview of an example system 100 for retrospective memory analysis. As illustrated, system 100 comprises retrospective analysis service 102, execution environments 110 and 112, client device 106, and network 108. In examples, retrospective analysis service 102, execution environments 110 and 112, and client device 106 communicate using network 108, which may comprise a local area network, a wireless network, or the Internet, or any combination thereof, among other examples.

A dashed box is illustrated around execution environment 110 and 112 to indicate that they may each be virtual machines or containers (e.g., executing on a host computing device 104) or physical computing devices. It will be appreciated that execution environment 110 and 112 need not each be the same type of execution environment and any number of execution environments may be processed according to aspects described herein. Further, execution environment 110 and 112 need not be co-located with one another, and retrospective analysis service 102 may act as a centralized archive of historical memory images. In other examples, multiple retrospective analysis services may be used, for example where each retrospective analysis service is proximate or co-located with a respective set of execution environments.

Retrospective analysis service 102 is illustrated as comprising memory image engine 114, data store 116, and memory image analyzer 118. In examples, memory image engine 114 obtains memory images of execution environments 110 and 112, for example according to a schedule or in response to the occurrence of an event (e.g., a manual indication from a user or identification of an issue of an execution environment), among other examples. Memory image engine 114 may store memory images in data store 116. For example, a memory image obtained for execution environment 110 may be stored in association with one or more other historical memory images of execution environment 110, thereby enabling retrospective analysis of execution environment 110 (e.g., by memory image analyzer 118 as discussed below). Similarly, a memory image obtained for execution environment 112 may be stored in association with one or more other historical memory images of execution environment 112.

In examples, memory image engine 114 processes a memory image according to a previously obtained memory image to generate a differentially encoded memory image, such that differential encoding techniques are used to store the memory image in data store 116. For example, an initial memory image may be stored in full (e.g., rather than as a differentially encoded representation), after which a predetermined number of subsequent memory images may be stored according to differential encoding techniques. A "key frame" memory image may be stored in full after the predetermined number of subsequent memory images, after which another predetermined number of subsequent memory images may be stored using differential encoding.

Compression techniques may be used in addition to or as an alternative to differential encoding techniques. As another example, memory images may be stored using a technique similar to that of a rolling buffer, where a predetermined number of memory images are retained and the oldest memory image may be deleted upon the addition of a new memory image, thereby retaining the predetermined number of images. In some instances, a memory image stored by data store 116 may be immutable once stored, such that the memory image is assured to be representative of the execution environment at the time the memory image was captured. While example storage techniques are described, it will be appreciated that other techniques may be used to store historical memory images in association with an execution environment to which they relate.

Retrospective analysis service 102 is further illustrated as comprising memory image analyzer 118, which may process a historical memory image of data store 116 to determine an environment condition for the associated execution environment. For example, memory image analyzer 118 may process a historical memory image to generate a set of characteristics for the execution environment as of when the historical memory image was captured. Example characteristics include, but are not limited to, executing processes, the executable content associated with such executing processes, open files, and/or open network sockets, among other examples. While analyses are described with respect to such characteristics, it will be appreciated that any of a variety of additional or alternative techniques may be used. For example, pattern matching may be used to identify the presence of a byte pattern in the memory image or the execution environment may be resumed according to the memory image to evaluate its resulting behavior, thereby enabling behavioral analysis of the execution environment according to a historical memory image.

Memory image analyzer 118 may process the set of characteristics according to a set of known issues to determine whether the set of characteristics is indicative of a known issue. As described above, the set of known issues may be different than issues that were known when the memory image was captured, thereby enabling retrospective analysis of the execution environment, even in instances where an issue was not known (and therefore evaded detection) at the time of the memory capture.

In addition to identification of an issue, memory image analyzer 118 may determine any of a variety of additional information associated with the environment condition. For example, memory image analyzer 118 may determine software associated with the issue (e.g., an application that was infected, an unpatched software exploit, or a function call that was hooked). As another example, memory image analyzer 118 may determine information associated with the issue itself, such as associated files, network activity, or memory content (e.g., a ransomware cryptographic key or a malware binary).

As a result of having an archive of historical images for the execution environment, memory image analyzer 118 may process memory images before or after a memory image in which an issue was identified to determine a date at which the environment condition was first present and/or a date at which the environment condition was no longer present. Such analyses by memory image analyzer 118 may be performed according to a schedule or in response to the occurrence of an event (e.g., a manual indication from a user or identification of an issue of an execution environment), among other examples.

In instances where a historical issue is identified, memory image analyzer 118 may generate an alert of the identified issue. In some instances, the alert may further indicate an identified start date and/or identified end date of the issue. For example, the alert may be provided to client device 106 in the form of an indication to an application executing on client device 106 or as an electronic communication, such as an email message or an instant message. Any of a variety of additional or alternative actions may be taken. For example, remediation may be performed on an execution environment in which the issue is determined to still be present.

While memory image analyzer 118 is described as processing historical memory images and environment characteristics determined therefrom, it will be appreciated that memory image analyzer 118 may further evaluate additional information associated with execution environment. For example, memory image analyzer 118 may process an associated file system snapshot, a video memory image, or a system firmware image, among other additional information. The additional information need not be captured at the same or a similar frequency as the associated memory image. Rather, such additional information may be correlated with the historical memory image, such that memory image analyzer 118 may process the additional information to identify issues with increased certainty or identify additional issues, among other examples.

In other examples, memory image analyzer 118 may generate the above-described execution environment characteristics and provide the generated characteristics for processing by a software information and event management (SIEM) software or service. For example, the characteristics may be provided to software that performs a similar analysis of the characteristics as would be performed for a currently executing execution environment. As another example, the characteristics may be provided to a cloud-based issue identification service. Thus, memory image analyzer 118 may act as an abstraction layer between historical memory images of an execution environment and a substantially real time analysis performed by such a SIEM solution. In such instances, the SIEM solution may generate alerts and/or perform other actions similar to those described herein.

In examples, retrospective analysis service 102 provides a website and/or application programming interface (API) via which a user can control operation of retrospective analysis service 102 and view or otherwise access memory analysis results generated by memory image analyzer 118. For example, client device 106 may request that a memory image be captured of execution environment 110 (e.g., now and/or according to a schedule) according to aspects described herein. For example, client device 106 may provide an indication to retrospective analysis service 102 to initiate a memory capture operation. The indication may comprise an identifier associated with execution environment 110, as well as a set of capture instructions (e.g., a time at which the capture should be taken, an event in response to which the capture should be taken, one or more regions of memory to capture, or one or more actions that should be taken upon the identification of an issue, etc.). As a result, memory image engine 114 may obtain a memory image of execution environment 110 and memory image analyzer 118 may process the memory image accordingly.

As another example, client device 106 may access or otherwise receive an issue indication generated by memory image analyzer 120. For example, a web browser application of client device 106 may be used to access the website associated with retrospective analysis service 102, on which memory analysis results associated with execution environment 110 may be presented. As another example, a native application executing on client device 106 may access such information using an API provided by retrospective analysis service 102. Thus, it will be appreciated that any of a variety of techniques may be used to interact with or otherwise manage retrospective analysis service 102 according to aspects of the present disclosure.

Retrospective analysis service 102 may be configured such that memory image analyzer 118 processes memory images substantially contemporaneously with their acquisition by memory image engine 114. As another example, memory image analyzer 118 may process the memory images according to a schedule and/or in response to a manual user indication. The operation of retrospective analysis service 102 may differ according to the context in which it is used. For example, memory images may be archived to provide on-demand post hoc attestation as to the state of execution environments 110 and/or 112. As another example, memory images may be archived to enable contemporaneous identification of issues as they are discovered, and further to identify a start date at which a now-known issue was first present within execution environments 110 and/or 112. Thus, the aspects described herein enable the automatic analysis of any number of execution environments, such that issues and their associated scope may be identified retroactively as new issues are identified.

While system 100 is illustrated as comprising a single retrospective analysis service 102, a two execution environments 110 and 112, and a single client device 106, it will be appreciated that any number of such elements may be used in other examples. Further, the functionality described above may be distributed among retrospective analysis service 102, execution environments 110 and 112, and/or client device 106 according to any of a variety of other paradigms in other examples.

Figure 2:
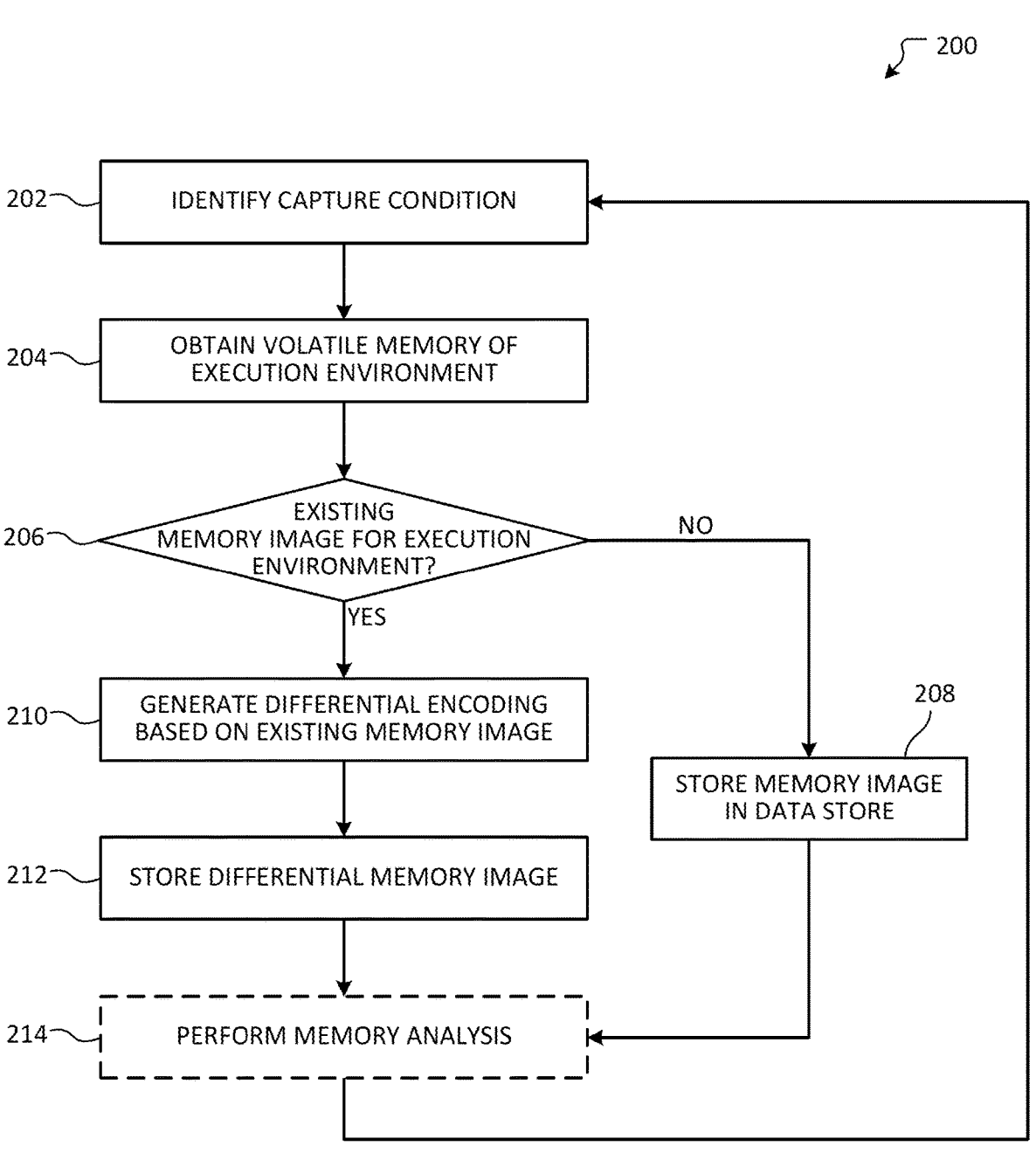
FIG. 2 illustrates an overview of an example method for retrospective memory archival and associated processing.

FIG. 2 illustrates an overview of an example method 200 for retrospective memory archival and associated processing. For example, aspects of method 200 may be performed by a retrospective analysis service, such as retrospective analysis service 102 described above with respect to FIG. 1.

Method 200 begins at operation 202, where a capture condition is identified. For example, it may be determined that a predetermined amount of time has passed since a previous memory image capture, that a schedule indicates a memory image capture should be obtained, or that an event has occurred, such as a manual indication or an issue identified at an execution environment.

Accordingly, flow progresses to operation 204, where volatile memory of an execution environment is obtained. As noted above, the volatile memory may be obtained according to any of a variety of techniques. While method 200 is described in the context of obtaining and processing a memory image for a single execution environment, it will be appreciated that any number of execution environments may be processed in other examples. For example, operation 204 may comprise obtaining volatile memory for multiple execution environments, such as multiple guests of a host computing device or multiple execution environments of an institution, among other examples.

At determination 206, it is determined whether there is an existing memory image for the execution environment. For example, determination 206 may comprise evaluating the content of a data store, such as data store 116 of retrospective analysis service 102 discussed above with respect to FIG. 1. In other examples, the determination may comprise evaluating a number of historical memory images associated with the execution environment, for example such that it may be determined to generate a key frame memory image after a predetermined number of differentially encoded memory images. Thus, it will be appreciated that any of a variety of additional or alternative determinations may be made at determination 206.

Returning to the instant example, if it is determined that a memory image does not exist for the execution environment, flow branches "NO" to operation 208, where the volatile memory is stored as a memory image in a data store. In examples, the memory image may be compressed. For example, the memory image may be stored in data store 116 discussed above with respect to FIG. 1. The memory image may be stored in association with the execution environment from which it was obtained. For example, the execution environment may have an associated identifier, such as a hostname or a globally unique identifier (GUID). In some instances, multiple data stores may be used, such that operation 208 comprises storing the memory image in a data store selected from a set of data stores. As illustrated, flow may progress to operation 214 (described below) or, in other examples, flow may loop and return to operation 202, where a subsequent memory image is generated in response to another capture condition.

If, however, it is determined there is an existing memory image for the execution environment, flow instead branches "YES" to operation 210, where a differential encoding is generated based on the existing memory image. For example, the differential encoding may comprise differences between the volatile memory that was obtained at operation 204 and the existing memory image. Accordingly, at operation 212, a differential memory image may be stored. Aspects of operation 212 may be similar to those of operation 208, where the differential memory image is stored in association with an identifier of the execution environment from which the volatile memory was obtained at operation 204. Accordingly, flow may progress to operation 214 (described below) or, in other examples, flow may loop and return to operation 202, where a subsequent memory image is generated in response to another capture condition.

At operation 214, memory analysis may be performed. For example, operation 214 may be performed contemporaneously with the generation of a memory image capture according to some configurations of a retrospective analysis service or, as another example, the capture condition identified at operation 202 may indicate that memory analysis should be performed. Accordingly, the memory image (e.g., as was stored at either operation 208 or 212) may be analyzed, for example by a memory image analyzer, such as memory image analyzer 118 discussed above with respect to FIG. 1. Such aspects may be similar to those of method 300 in FIG. 3, which is discussed below. As illustrated, flow may then return to operation 202, where a subsequent memory image is generated in response to another capture condition.

Figure 3:
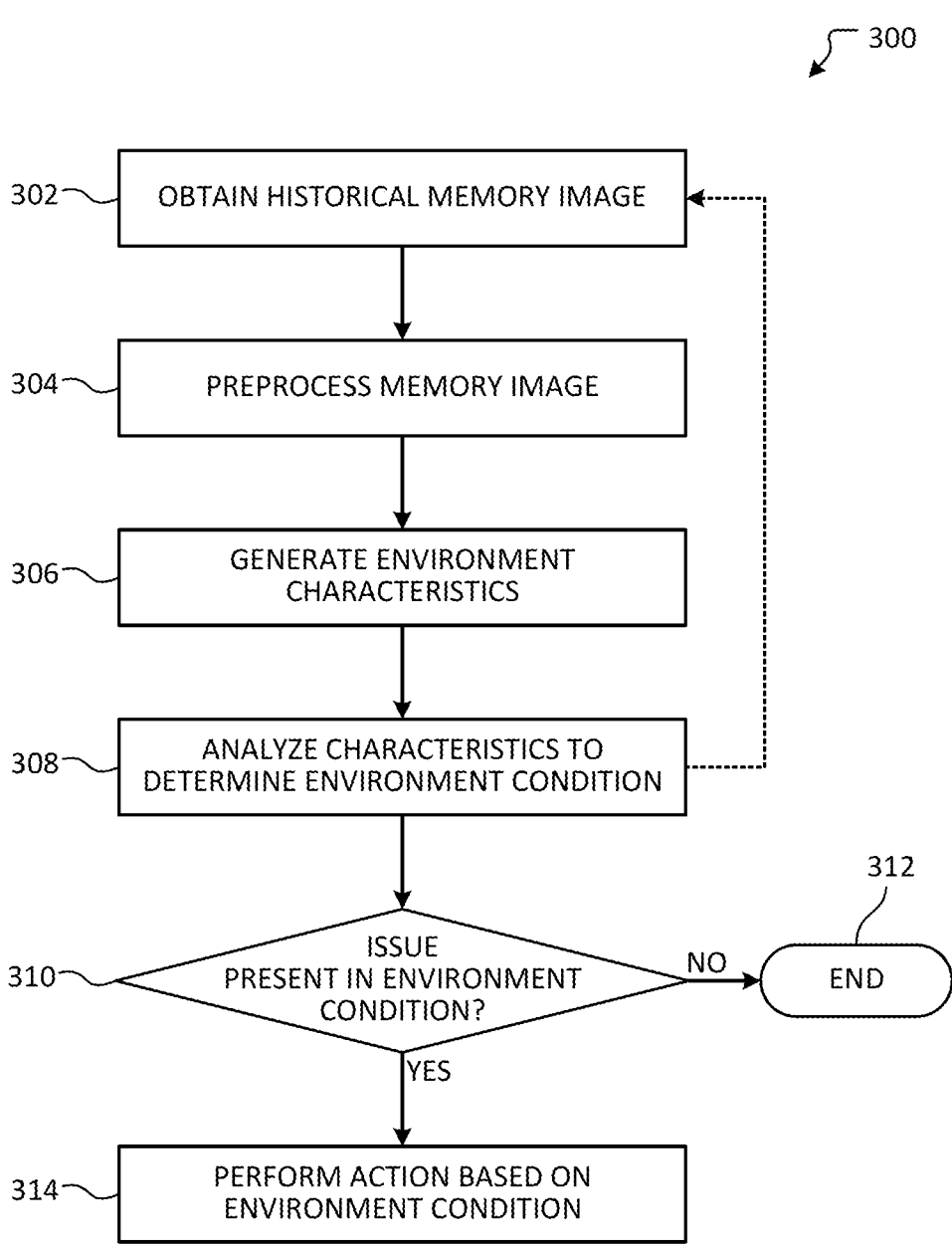
FIG. 3 illustrates an overview of an example method for processing a retrospective memory image according to aspects described herein.

FIG. 3 illustrates an overview of an example method 300 for processing a retrospective memory image according to aspects described herein. In examples, aspects of method 300 may be performed by a memory image analyzer, such as memory image analyzer 118 discussed above with respect to FIG. 1.

Method 300 begins at operation 302, where a historical memory image is obtained. For example, the memory image may be obtained from a data store of a retrospective analysis service, such as data store 116 of retrospective analysis service 102 discussed above with respect to FIG. 1. In examples, the historical memory image may be differentially encoded, such that data of one or more previous historical memory images is accessed at operation 302.

At operation 304, the memory image is preprocessed. For example, the execution environment from which the memory image was obtained may implement address space layout randomization (ASLR) techniques, such that content of the memory image may be non-contiguous. Accordingly, operation 304 may comprise preprocessing the memory image to reverse or otherwise account for at least a part of the ASLR techniques applied to the memory image.

For example, there may be data associated with the execution environment that is unlikely to change as a result of an issue (e.g., data that is associated with stability of the execution environment), such that the data may be used to identify associated patterns and reduce or otherwise account for the potentially random layout of associated data within the memory image. Thus, various landmarks within the memory image may facilitate further processing of the memory image. In some instances, such landmark data may vary according to a kernel version or other attributes of the execution environment, such that the processing performed at operation 304 may be associated with attributes of the execution environment. For instance, offsets of landmark data and/or the landmark data itself may be unique to a kernel version or a specific build of the kernel, among other examples.

At operation 306, environment characteristics are generated. For example, the set of environment characteristics generated at operation 306 include, but are not limited to, executing processes, the executable content associated with such executing processes, open files, and/or open network sockets, among other examples. In some instances, operation 306 is performed in view of the preprocessing performed at operation 304, for example to determine a memory location of a process list, open files, and/or open network sockets of the execution environment.

Flow progresses to operation 308, where the characteristics generated at operation 306 are analyzed to determine a condition for the execution environment. For example, rules associated with known issues may be used to evaluate the set of characteristics, such that it may be determined whether the set of characteristics is indicative of a known issue. Each known issue may have an associated signature, such that the set of characteristics may be processed to determine whether the signature is present in the execution environment.

Operation 308 may comprise additional processing associated with an identified issue, for example to determine information associated with the issue itself, such as associated files, network activity, or memory content (e.g., a ransomware cryptographic key or a malware binary). As another example, operation 308 may further comprise processing additional information associated with the execution environment that is correlated to the time at which the historical memory image obtained at operation 302 was captured.

In other examples, operation 308 may additionally or alternatively comprise providing an indication of at least a part of the set of characteristics to an SIEM solution, such that the SIEM solution may process the characteristics and generate alerts and/or perform other actions accordingly. As a result of operation 308, the environment condition may be determined, where the environment condition may comprise one or more issues associated with the set of environment characteristics.

A dotted arrow is illustrated from operation 308 to operation 302 to indicate that, in some examples, multiple iterations of operations 302-308 may be performed prior to arriving at determination 310. For example, the identification of some issues may be possible or otherwise increase in confidence as a result of processing multiple historical memory images for a given execution environment. As another example, operations 302-308 may be performed with respect to multiple execution environments, as certain issues may manifest among a group of execution environments rather than with respect to a sole execution environment.

At determination 310, it is determined whether an issue is present in the environment condition. Thus, in some instances, operation 308 may not identify any known issues, such that determination 310 may branch "NO" and end at operation 312. By contrast, if a known issue is identified, flow may instead branch "YES" to operation 314, where an action is performed based on the environment condition. For example, the action may comprise generating an alert as to an identified issue, determining a start date or end date for the issue (e.g., according to a subsequent iteration of aspects of method 300 using an earlier or later memory image), or remediating the issue at the execution environment if the issue is still present, among other examples.

In some examples, the result of operations 304 or 306 may cached to simplify and/or increase the efficiency of method 300. For example, a preprocessed memory image may be cached, such that operation 304 may comprise accessing the cached preprocessed memory image rather than preprocessing the memory image again, as may be the case when performing an additional analysis of a historical memory image in light of a newly identified issue. Similarly, environment characteristics may be cached, such that the cached environment characteristics may be used at operation 306.

By contrast, such caching may not be used in instances where a newly-identified issue may have evaded detection as a result of previously applied processing by operations 304 and/or 306. As a result, a memory image may be preprocessed and/or environment characteristics may be generated according to an updated process to account for potential adaptation by a newly identified issue. Thus, the ability to alter processing of archived memory images enables the processing techniques described herein to adapt to changes and to identify issues that would otherwise have gone undetected under previous iterations of method 300. Method 300 terminates at operation 314.

Figure 4:
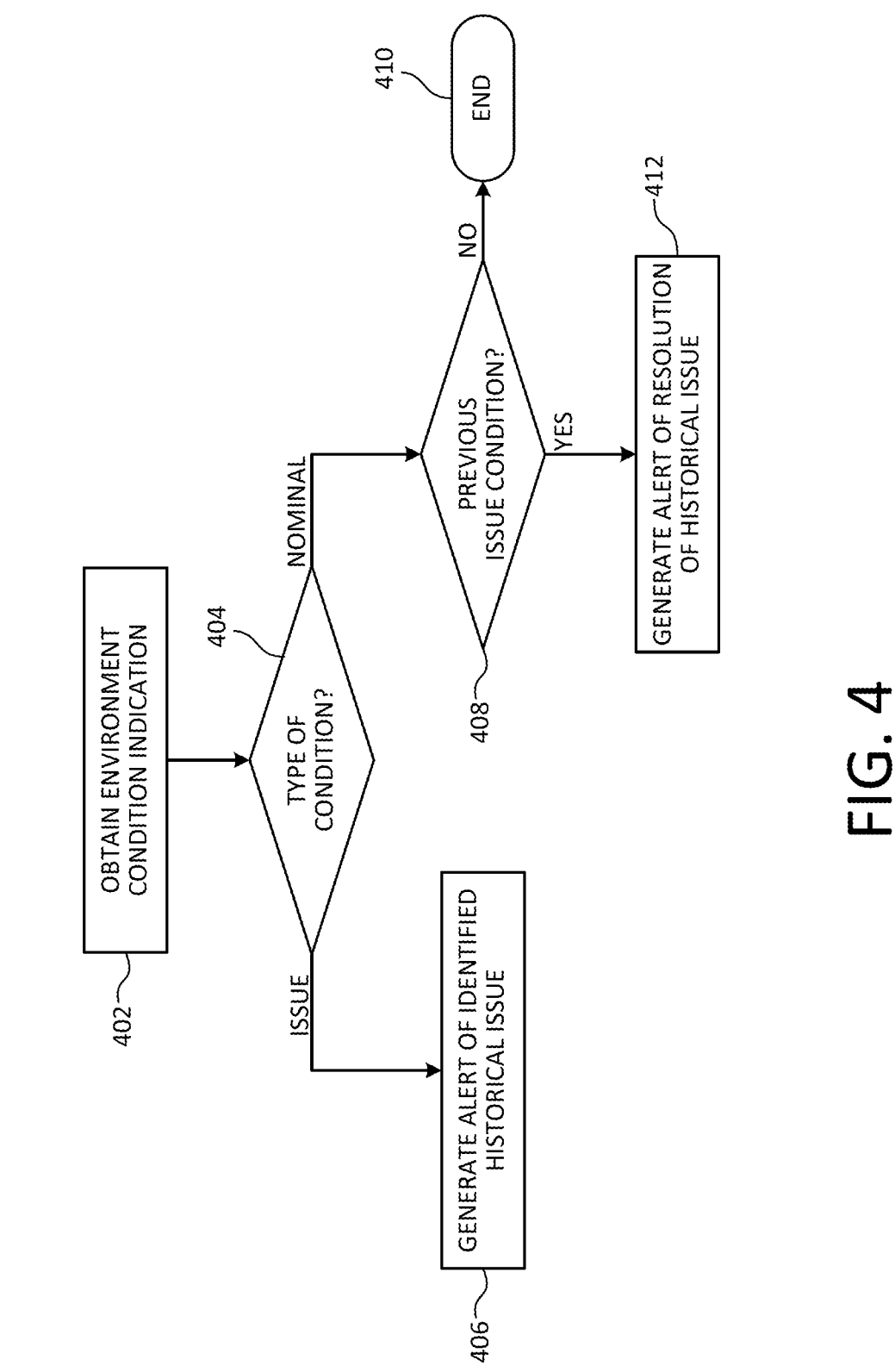
FIG. 4 illustrates an overview of an example method for processing an environment condition according to aspects described herein.

FIG. 4 illustrates an overview of an example method 400 for processing an environment condition according to aspects described herein. Aspects of method 400 may be performed by a memory image analyzer (e.g., memory image analyzer 118 in FIG. 1) or a SIEM solution, among other examples.

As illustrated, method 400 begins at operation 402, where an environment condition indication is obtained. For example, the environment condition indication may be associated with a determined environment condition as a result of aspects of method 300 discussed above with respect to method 300 in FIG. 3.

At determination 404, the type of environment condition is determined. For example, if the environment condition indication indicates that the execution environment has an issue, flow branches "ISSUE" to operation 406, where an alert of an identified historical issue is generated. In examples, the alert comprises information associated with the issue, such files, network activity, or memory content associated with the issue, as may have been determined as a result of performing aspects of operation 308 discussed above with respect to method 300 of FIG. 3. In other examples, the alert may comprise an indication of a last known good state for the execution environment, as may be determined by processing previous historical memory images of the execution environment to determine whether and/or when a memory image was last captured that did not exhibit the issue. Flow terminates at operation 406.

By contrast, if the condition does not indicate an issue, flow branches "NOMINAL" to determination 408, where it is determined whether there was a previous issue with the execution environment. For example, determination 408 may comprise evaluating whether an alert of an identified historical issue was previously generated (e.g., as may have been generated by operation 406) for the execution environment associated with the condition indication that was received at operation 402. If there was not a previous issue, flow branches "NO" at terminates at operation 410.

However, if it is determined that an issue was previously identified for the execution environment, flow instead branches "YES" to operation 412, where an alert is generated that a previously identified historical issue was resolved. For example, the alert may comprise an indication as to a date on which the issue was no longer identified. The alert may comprise information associated with the resolved issue, such files, network activity, or memory content, as may have been determined as a result of performing aspects of operation 308 discussed above with respect to method 300 of FIG. 3. Method 400 terminates at operation 412.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
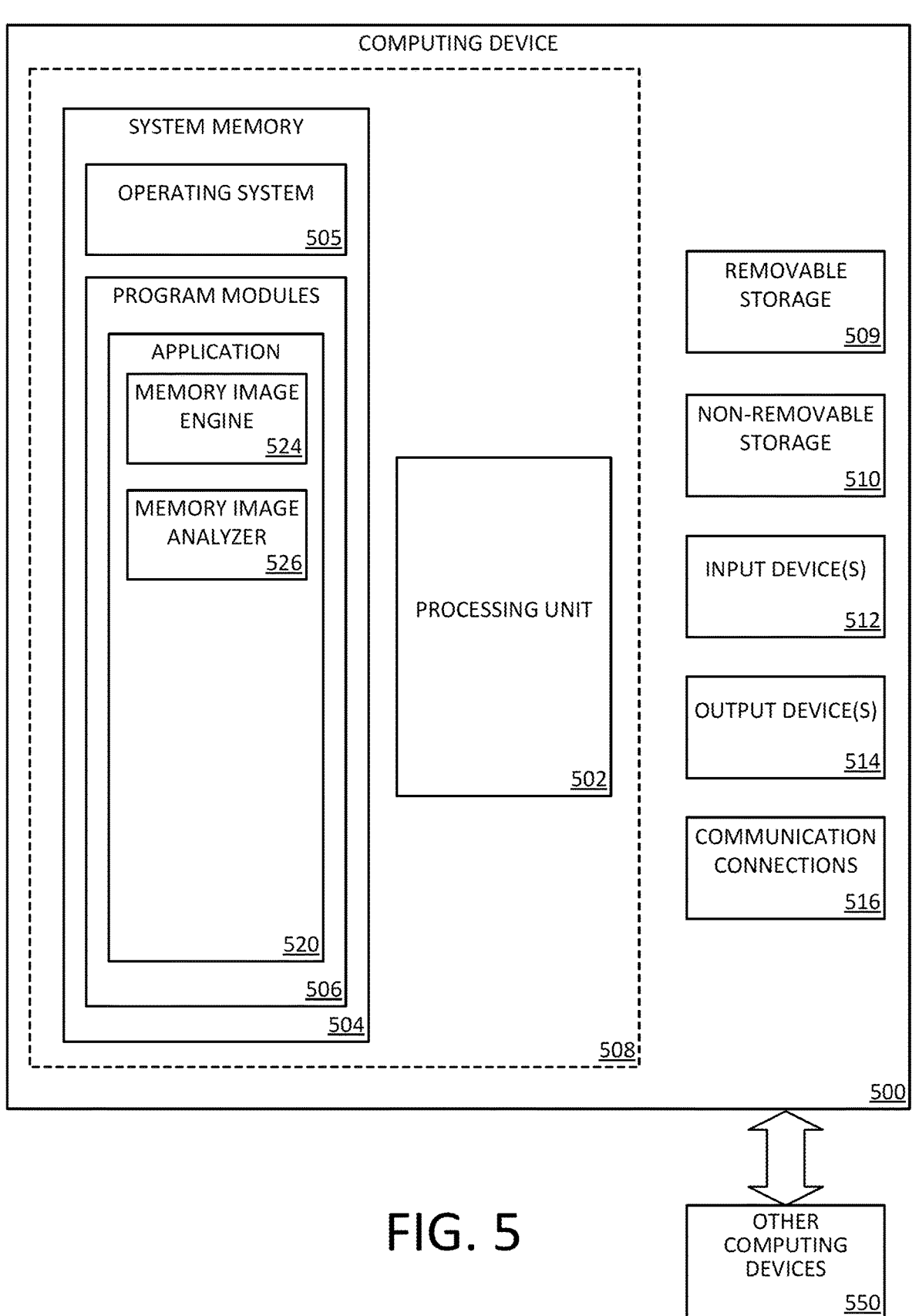
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including retrospective analysis service 102, execution environments 110 and 112, and client device 106 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store memory image engine 524 and memory image analyzer 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
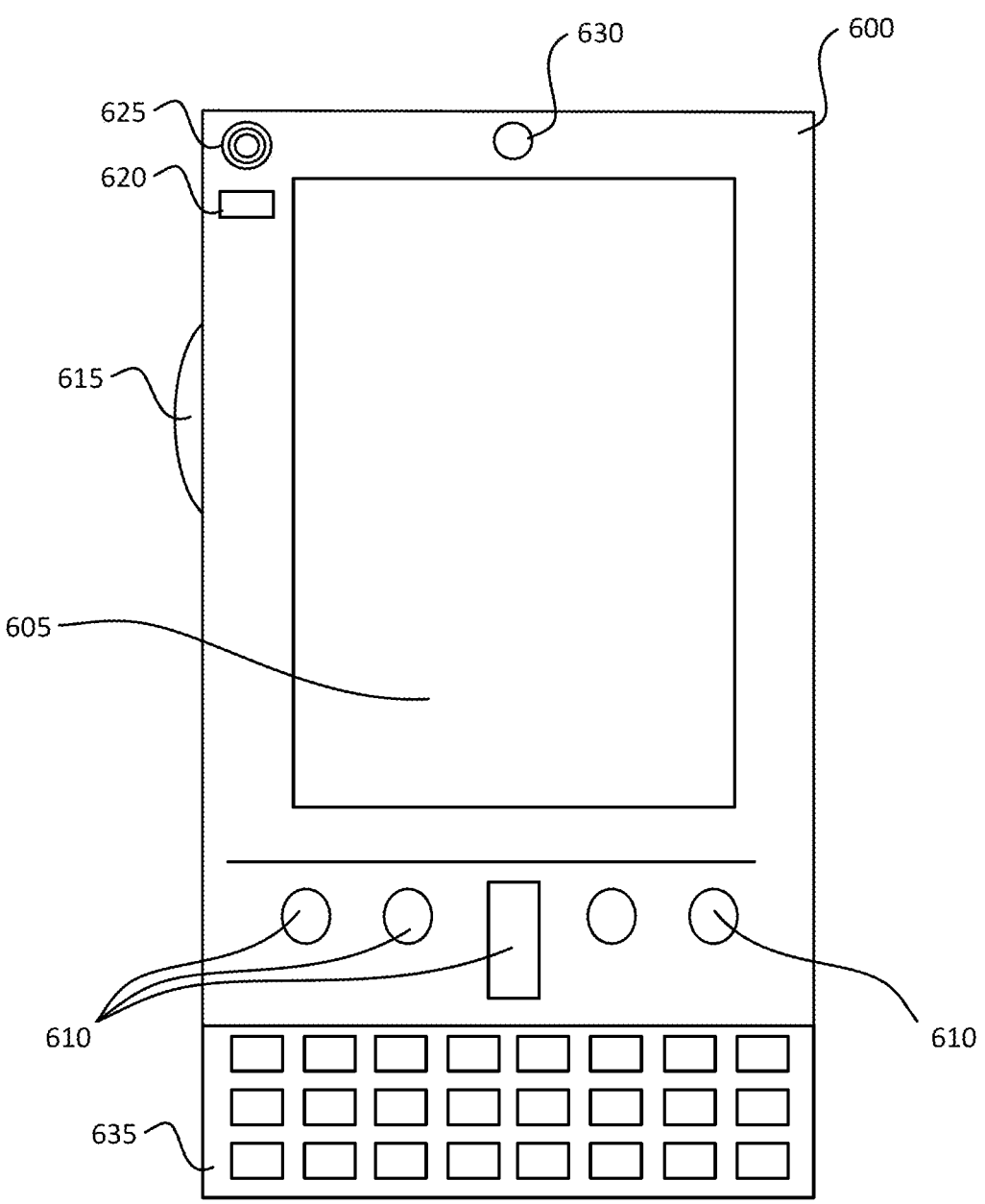
FIGS. 6A and 6B are simplified block diagrams of a mobile computing device with which aspects of the present disclosure may be practiced.
Figure 6B:
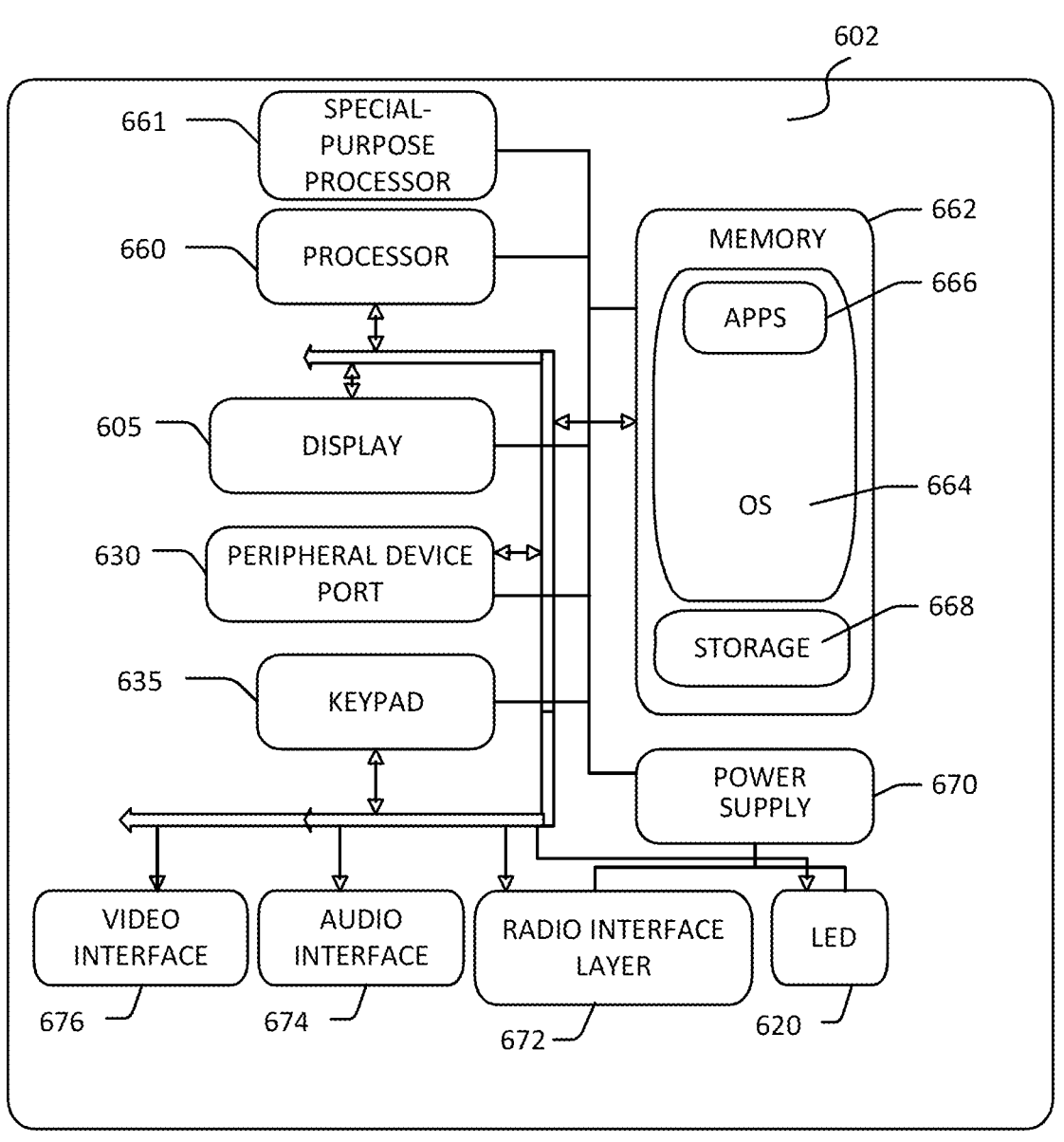

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
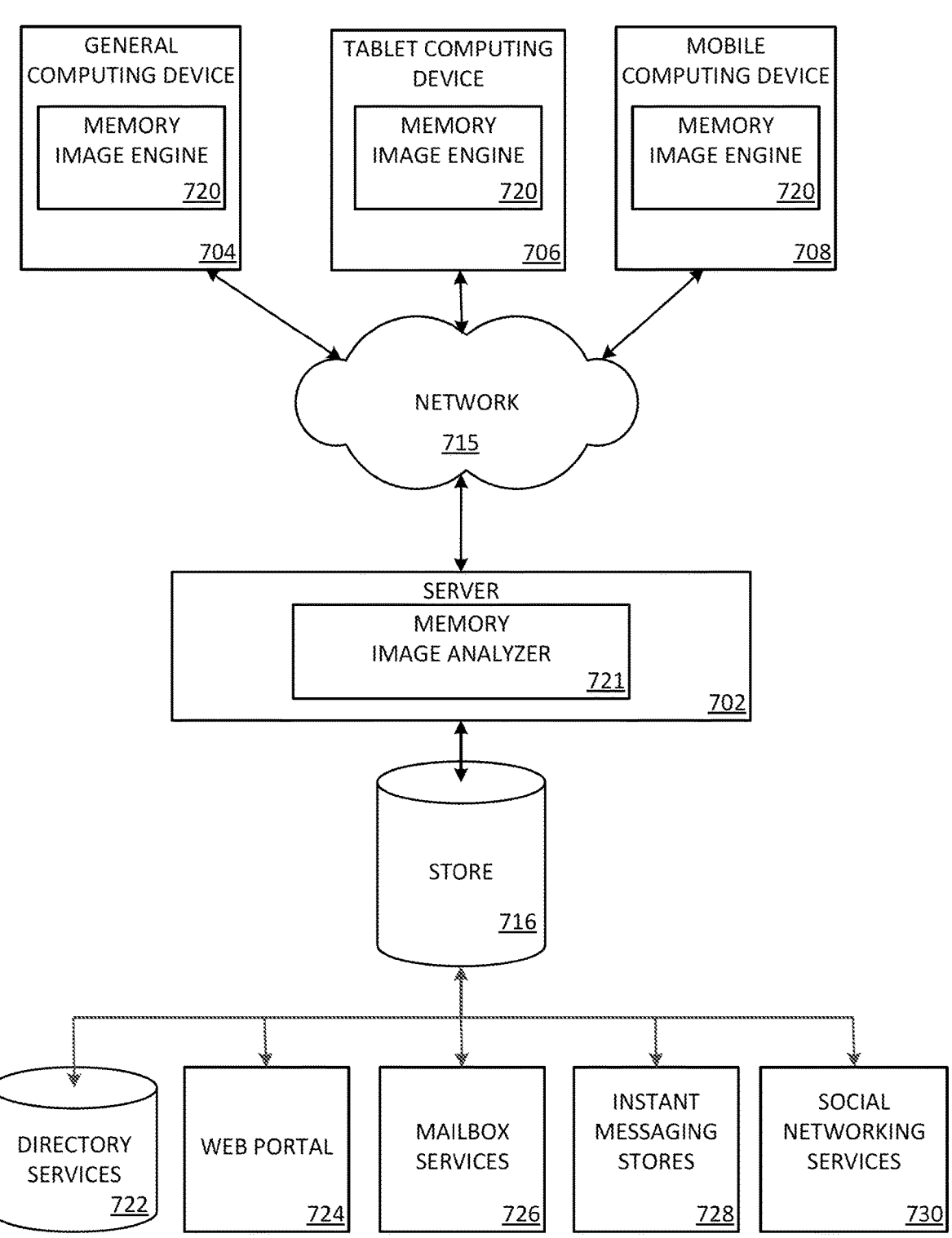
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A memory image engine 720 may be employed by a client that communicates with server device 702, and/or memory image analyzer 721 may be employed by server device 702. The server device 702 may provide data to and from a client computing device such as a personal computer 704, a tablet computing device 706 and/or a mobile computing device

708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either preprocessed at a graphic-originating system, or post-processed at a receiving computing system.

Figure 8:
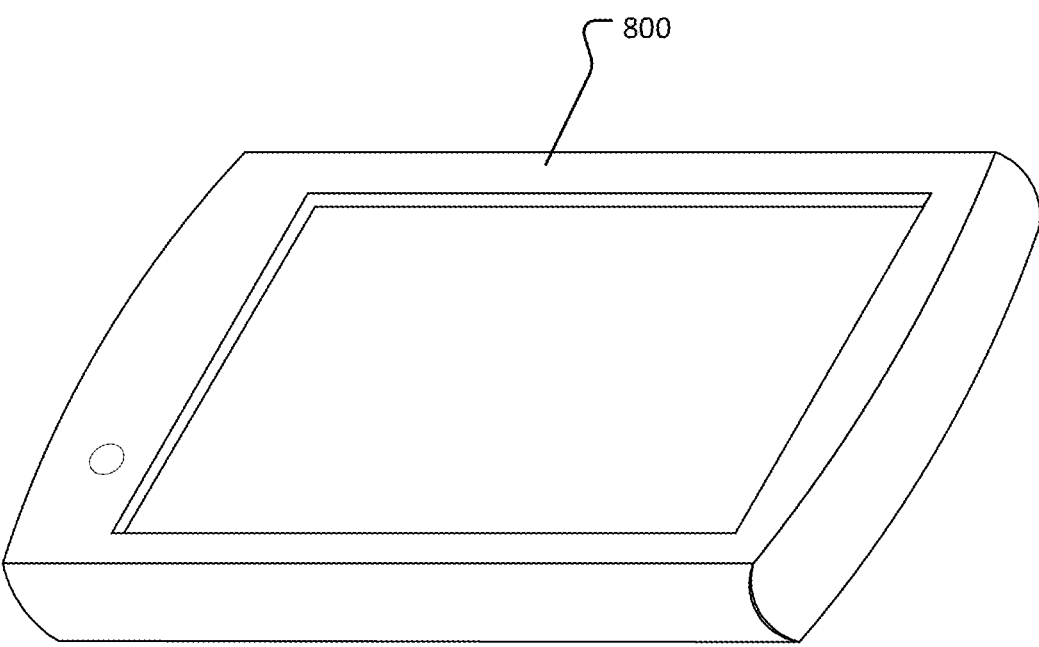
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: obtaining a historical memory image of an execution environment; processing the historical memory image to generate a set of environment characteristics for the execution environment; evaluating the set of environment characteristics to identify an issue of the execution environment; and generating, based on the identified issue, a historical issue alert for the execution environment. In an example, the identified issue was unknown when the historical memory image was captured. In another example, the historical memory image is a first historical memory image; the set of environment characteristics is a first set of environment characteristics; and the set of operations further comprises: obtaining a second historical memory image of the section environment; and evaluating a second set of environment characteristics associated with the second historical memory image to determine the issue was not present in the execution environment when the second historical memory image was captured. In a further example, the historical memory image is a differentially encoded historical memory image associated with an earlier historical memory image of the execution environment. In yet another example, evaluating the set of environment characteristics comprises: providing the set of environment characteristics to a software information and event management (SIEM) solution; and receiving, from the SIEM solution, an indication of the identified issue. In a further still example, processing the historical memory image comprises preprocessing the historical memory image to identify non-contiguous data resulting from address space layout randomization by the execution environment. In an example, the set of environment characteristics is identified based on additional information associated with the execution environment; and the additional information is correlated with the historical memory image.

In another aspect, the technology relates to a method for processing a historical memory image. The method comprises: obtaining a historical memory image of an execution environment; evaluating a set of environment characteristics associated with a preprocessed representation of the historical memory image to identify an issue of the execution environment, wherein the identified issue was unknown when the historical memory image was captured; and generating, based on the identified issue, a historical issue alert for the execution environment. In an example, the preprocessed representation of the historical memory image is cached for the execution environment. In another example, the set of environment characteristics is cached for the execution environment. In a further example, the method further comprises: processing the cached preprocessed representation of the historical memory image to generate the set of environment characteristics for the execution environment. In yet another example, the method further comprises: identifying non-contiguous data resulting from address space layout randomization by the execution environment to generate the preprocessed representation of the historical memory image. In a further still example, the historical memory image is immutable.

In a further aspect, the technology relates to a method for retrospective memory analysis. The method comprises: obtaining a historical memory image of an execution environment; processing the historical memory image to generate a set of environment characteristics for the execution environment; evaluating the set of environment characteristics to identify an issue of the execution environment; and generating, based on the identified issue, a historical issue alert for the execution environment. In an example, the identified issue was unknown when the historical memory image was captured. In another example, the historical memory image is a first historical memory image; the set of environment characteristics is a first set of environment characteristics; and the method further comprises: obtaining a second historical memory image of the section environment; and evaluating a second set of environment characteristics associated with the second historical memory image to determine the issue was not present in the execution environment when the second historical memory image was captured. In a further example, the historical memory image is a differentially encoded historical memory image associated with an earlier historical memory image of the execution environment. In yet another example, evaluating the set of environment characteristics comprises: providing the set of environment characteristics to a software information and event management (SIEM) solution; and receiving, from the SIEM solution, an indication of the identified issue. In a further still example, processing the historical memory image comprises preprocessing the historical memory image to identify non-contiguous data resulting from address space layout randomization by the execution environment. In an example, the set of environment characteristics is identified based on additional information associated with the execution environment; and the additional information is correlated with the historical memory image.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
identifying a capture condition and a historical memory image;
obtaining a volatile memory of an execution environment;
generating a differential encoding image based on the historical memory image and obtained volatile memory, wherein the historical memory image is one of:
a differentially encoded historical memory image associated with an earlier key frame memory image of the execution environment, or
a key frame memory image; and
storing the differential encoding image.

2. The system of claim 1, wherein:
the historical memory image has an associated first set of environment characteristics; and
the set of operations further comprises:
evaluating, based on the first set of environment characteristics, a second set of environment characteristics associated with the obtained volatile memory to determine an issue was not present in the execution environment when the historical memory image was captured.

3. The system of claim 2, wherein the evaluating comprises:
providing the second set of environment characteristics to a software information and event management (SIEM) solution; and
receiving, from the SIEM solution, an indication of the issue.

4. The system of claim 2, wherein:
the second set of environment characteristics is identified based on additional information associated with the execution environment; and
the additional information is correlated with the historical memory image.

5. The system of claim 1, wherein processing the historical memory image comprises preprocessing the historical memory image to identify non-contiguous data resulting from address space layout randomization by the execution environment.

6. The system of claim 1, wherein a preprocessed representation of the key frame memory image is cached for the execution environment.

7. The system of claim 1, wherein the key frame memory image is immutable.

8. A method for processing a historical memory image, the method comprising:
identifying a capture condition and a key frame memory image;
obtaining a volatile memory of an execution environment;
generating differential encoding image based on the key frame memory image and the obtained volatile memory; and
storing the differential encoding image.

9. The method of claim 8, wherein a preprocessed representation of the key frame memory image is cached for the execution environment.

10. The method of claim 9, wherein a set of environment characteristics is cached for the execution environment.

11. The method of claim 10, wherein the method further comprises:
processing the cached preprocessed representation to generate the set of environment characteristics for the execution environment.

12. The method of claim 8, wherein the method further comprises:
identifying non-contiguous data resulting from address space layout randomization by the execution environment to generate the preprocessed representation of the historical memory image.

13. The method of claim 8, wherein the key frame memory image is immutable.

14. A method for retrospective memory analysis, the method comprising:
identifying a capture condition and a historical memory image;
obtaining a volatile memory of an execution environment;
generating a differential encoding image based on the historical memory image and the obtained volatile memory, wherein the historical memory image is one of:
a differentially encoded historical memory image associated with an earlier key frame memory image of the execution environment, or
a key frame memory image; and
storing the differential encoding image.

15. The method of claim 14, wherein:
the historical memory image has an associated first set of environment characteristics; and
the method further comprises:
evaluating, based on the first set of environment characteristics, a second set of environment characteristics associated with obtained volatile memory to determine an issue was not present in the execution environment when the historical memory image was captured.

16. The method of claim 15, wherein:
the set of environment characteristics is identified based on additional information associated with the execution environment; and
the additional information is correlated with the historical memory image.

17. The method of claim 14, wherein the evaluating comprises:

providing the second set of environment characteristics to a software information and event management (SIEM) solution; and receiving, from the SIEM solution, an indication of the issue.

18. The method of claim 14, wherein processing the historical memory image comprises preprocessing the historical memory image to identify non-contiguous data resulting from address space layout randomization by the execution environment.

19. The method of claim 14, wherein a preprocessed representation of the key frame memory image is cached for the execution environment.

20. The method of claim 14, wherein the key frame memory image is immutable.

\* \* \* \* \*